US 12,435,915 B2

United States Patent
Gao et al.

(10) Patent No.: US 12,435,915 B2
(45) Date of Patent: Oct. 7, 2025

(54) COMPRESSOR FREQUENCY REGULATION METHOD, CONTROL APPARATUS, HEAT EXCHANGE DEVICE AND ELECTRONIC DEVICE

(71) Applicants: Guangdong Midea White Home Appliance Technology Innovation Center Co., Ltd., Foshan (CN); Midea Group Co., Ltd., Foshan (CN)

(72) Inventors: Keke Gao, Foshan (CN); Qixiong Tang, Foshan (CN); Su Zhang, Foshan (CN); Chun Gong, Foshan (CN); Jiaqiang Zhao, Foshan (CN)

(73) Assignees: Guangdong Midea White Home Appliance Technology Innovation Center Co., Ltd., Foshan (CN); Midea Group Co., Ltd., Foshan (CN)

( * ) Notice: Subject to any disclaimer, the term of this patent is extended or adjusted under 35 U.S.C. 154(b) by 196 days.

(21) Appl. No.: 18/215,067

(22) Filed: Jun. 27, 2023

(65) Prior Publication Data

US 2023/0417466 A1 Dec. 28, 2023

Related U.S. Application Data

(63) Continuation of application No. PCT/CN2021/133182, filed on Nov. 25, 2021.

(30) Foreign Application Priority Data

Dec. 28, 2020 (CN) .......................... 202011597137.1

(51) Int. Cl.
*F25B 49/02* (2006.01)
*D06F 33/76* (2020.01)
(Continued)

(52) U.S. Cl.
CPC ............ *F25B 49/025* (2013.01); *D06F 33/76* (2020.02); *D06F 58/206* (2013.01); *D06F 58/24* (2013.01);
(Continued)

(58) Field of Classification Search
CPC .............. F25B 2500/12; F25B 2500/29; F25B 2600/0253; F25B 2700/21152;
(Continued)

(56) References Cited

U.S. PATENT DOCUMENTS 4,354,547 A 10/1982 Sugiura
7,442,012 B2 10/2008 Moens
(Continued)

FOREIGN PATENT DOCUMENTS

CN 103882665 A 6/2014
CN 105051281 A 11/2015
(Continued)

OTHER PUBLICATIONS

Midea Group Co., Ltd., ISRWO, PCT/CN2021/133182, Feb. 9, 2022, 7 pgs.
(Continued)

*Primary Examiner* — Jerry-Daryl Fletcher
*Assistant Examiner* — Daniel C Comings
(74) *Attorney, Agent, or Firm* — Morgan, Lewis & Bockius LLP

(57) ABSTRACT

A compressor frequency regulation method includes acquiring a first exhaust temperature of a compressor operating at a first operating frequency; determining that the first exhaust temperature is greater than or equal to a first preset temperature; controlling the compressor to perform frequency reduction processing, the frequency reduction processing reducing the first operating frequency to a second operating frequency, such that a second exhaust temperature of the
(Continued)

compressor operating at the second operating frequency is less than the first preset temperature; and controlling the compressor to operate at the second operating frequency.

14 Claims, 6 Drawing Sheets

(51) Int. Cl.
*D06F 58/20* (2006.01)
*D06F 58/24* (2006.01)
*D06F 58/52* (2020.01)
*D06F 103/50* (2020.01)
*D06F 105/26* (2020.01)

(52) U.S. Cl.
CPC .......... *D06F 58/52* (2020.02); *F25B 49/022* (2013.01); *D06F 2103/50* (2020.02); *D06F 2105/26* (2020.02); *F25B 2500/29* (2013.01); *F25B 2600/0253* (2013.01); *F25B 2700/2115* (2013.01); *F25B 2700/21152* (2013.01)

(58) Field of Classification Search
CPC .......... F25B 2600/0251; F25B 2600/07; F25B 2700/2104; D06F 58/00; D06F 58/206; D06F 58/24; D06F 58/52; D06F 2103/50; D06F 2105/26

See application file for complete search history.

(56) References Cited

U.S. PATENT DOCUMENTS

| | | | |
|---|---|---|---|
| 10,746,176 B2 | 8/2020 | Johnson et al. | |
| 2005/0214128 A1* | 9/2005 | Moens | F04B 49/103 |
| | | | 417/18 |
| 2015/0192334 A1* | 7/2015 | Hancock | F04C 29/04 |
| | | | 415/177 |
| 2019/0257563 A1 | 8/2019 | Xu et al. | |
| 2020/0011324 A1 | 1/2020 | Oshiro | |
| 2020/0263346 A1* | 8/2020 | Lee | D06F 58/34 |

FOREIGN PATENT DOCUMENTS

| | | |
|---|---|---|
| CN | 105839376 A | 8/2016 |
| CN | 107101338 A | 8/2017 |
| CN | 107841861 A | 3/2018 |
| CN | 108518806 A | 9/2018 |
| CN | 110905791 A | 3/2020 |
| CN | 111380185 A | 7/2020 |
| CN | 111397169 A | 7/2020 |
| CN | 111649442 A | 9/2020 |

OTHER PUBLICATIONS

Midea Group Co., Ltd., Extended European Search Report, EP Patent Application No. 21913649.6, May 7, 2024, 14 pgs.

* cited by examiner

COMPRESSOR FREQUENCY REGULATION METHOD, CONTROL APPARATUS, HEAT EXCHANGE DEVICE AND ELECTRONIC DEVICE

CROSS-REFERENCE TO RELATED APPLICATION

The present application is a continuation of International Patent Application No. PCT/CN2021/133182 filed on Nov. 25, 2021, which claims priority to Chinese Application No. 202011597137.1 filed on Dec. 28, 2020, entitled "Compressor Frequency Regulation Method, Control Apparatus, Heat Exchange Device and Electronic Device," the contents of which is hereby incorporated by reference in its entirety.

TECHNICAL FIELD

The present application relates to the field of heat exchange, in particular to a method and a control apparatus for adjusting a frequency of a compressor, a heat exchange device, an electronic device and a non-transitory computer-readable storage medium.

BACKGROUND

In household appliances, heat exchange is often used for drying. For example, it is widely used in a clothes dryer, an integrated washer dryer and other devices in daily life. Taking the clothes dryer as an example, an exhaust temperature of a compressor may continue to rise during the operation of the clothes dryer, especially at a higher ambient temperature, the exhaust temperature of the compressor may be too high, which may cause the compressor to shut down and may result in longer drying time and increased energy consumption.

In addition, other heat exchange devices with a compressor may also have the compressor shut down due to exhaust temperature of the compressor being too high, which affects the stability and energy consumption of the heat exchange devices.

SUMMARY

The present application provides a method for adjusting a frequency of a compressor, which may reduce an excessive exhaust temperature of the compressor by adjusting the frequency of the compressor, and may improve a heat exchange efficiency and may also simplify a structure of a heat exchange system and suppress noise.

The present application further provides a control apparatus for adjusting a frequency of a compressor.

The present application further provides a heat exchange device.

The present application further provides an electronic device.

The present application further provides a non-transitory computer-readable storage medium.

The method for adjusting a frequency of a compressor according to the embodiment of present application includes: acquiring a first exhaust temperature of the compressor operating at a first operating frequency; in accordance with a determination that the first exhaust temperature is equal to or greater than a first preset temperature; controlling the compressor to perform frequency reduction processing to reduce the first operating frequency to a second operating frequency, and make a second exhaust temperature of the compressor operating at the second operating frequency be lower than the first preset temperature; and controlling the compressor to operate at the second operating frequency.

In the method for adjusting the frequency of the compressor according to the embodiment of the present application, in accordance with a determination that the exhaust temperature of the compressor is equal to or greater than the first preset temperature, the frequency reduction processing is performed on the compressor to reduce the exhaust temperature of the compressor to be less than the first preset temperature. The exhaust temperature of the compressor is suppressed through a frequency conversion control mode to reduce exhaust temperature of the compressor, a fan used for cooling the compressor can be saved, a number of components of the heat exchange system is reduced, the structure of the heat exchange system may be simplified. In accordance with a determination that no fan is required to cool the compressor, the compressor can be wrapped to reduce noise effectively.

According to an embodiment of the present application, the first operating frequency is controlled to reduce to the second operating frequency by a first preset frequency difference over one or more times of frequency reduction.

According to an embodiment of the present application, the first preset frequency difference increases as the number of times of frequency reduction increases.

According to an embodiment of the present application, the method further includes: in accordance with a determination that a second exhaust temperature of the compressor operating at the second operating frequency is less than a second preset temperature; controlling the compressor to perform frequency increase processing to lift the second operating frequency to a third operating frequency, and make a third exhaust temperature of the compressor operating at the third operating frequency be greater than a second preset temperature; and controlling the compressor to operate at the third operating frequency.

According to an embodiment of the present application, in the controlling the compressor to perform frequency reduction processing, the first operating frequency is controlled to reduce to the second operating frequency by the first preset frequency difference over one or more times of frequency reduction; before determining that the second exhaust temperature is less than the second preset temperature, the second preset temperature is determined, and the second preset temperature is determined based on the number of times of frequency reduction being less than a first preset value.

According to an embodiment of the present application, the first preset value is an integer less than or equal to 3.

According to an embodiment of the present application, before determining that the second exhaust temperature is less than the second preset temperature, the second preset temperature is determined, and a temperature difference between the second preset temperature and the first preset temperature is less than or equal to a preset temperature difference.

According to an embodiment of the present application, in the controlling the compressor to perform frequency increase processing, the second operating frequency is increased to a third operating frequency by a second preset frequency difference over one or more times of frequency increase.

According to an embodiment of the present application, in the second operating frequency is increased to a third operating frequency by a second preset frequency difference over one or more times of frequency increase; the second preset frequency difference and the number of times of frequency lifting are determined based on a temperature difference between the second preset temperature and the first preset temperature.

According to an embodiment of the present application, before the acquiring a first exhaust temperature of the compressor operating at a first operating frequency; the method includes: determining the first operating frequency of the compressor based on an ambient temperature.

According to an embodiment of the present application, the determining the first operating frequency of the compressor based on the ambient temperature includes: determining a first frequency as the first operating frequency in accordance with a determination that the ambient temperature is less than or equal to a first temperature or determining a second frequency as the first operating frequency in accordance with a determination that the ambient temperature is greater than the first temperature, where the second frequency is less than the first frequency.

A control apparatus for adjusting a frequency of a compressor according to the embodiment of present application includes: a first acquiring module, used to acquire a first exhaust temperature of the compressor operating at a first operating frequency; a first determining module, used to determine that the first exhaust temperature is equal to or greater than a first preset temperature; a first frequency adjusting module, used to control the compressor to perform frequency reduction processing to reduce the first operating frequency to a second operating frequency, and make a second exhaust temperature of the compressor operating at the second operating frequency be lower than the first preset temperature; and a first operating nodule, used to control the compressor to operate at the second operating frequency.

A heat exchange device according to the embodiment of the present application includes: a heat exchange assembly, including a compressor, a condenser, a throttling device and an evaporator connected to form a heat exchange cycle; and a controller, used to control the compressor to perform the method for adjusting the frequency of the compressor as described above.

According to an embodiment of the present application, the compressor is wrapped with a noise reduction layer.

According to an embodiment of the present application, the heat exchange device further includes a housing, the heat exchange assembly is arranged inside the housing, and no fan for cooling the compressor is arranged inside the housing.

According to an embodiment of the present application, the heat exchange device is a clothes dryer or a washer dryer.

An embodiment of the present application further provides an electronic device, including a processor and a memory storing a computer program executable on the processor, the computer program, when executed by the processor, causes the electronic device to perform the method for adjusting a frequency of a compressor mentioned above.

The present application also provides a non-transitory computer-readable storage medium storing a computer program, the computer program, when executed by a processor, causes the processor to perform the method for adjusting a frequency of a compressor mentioned above.

One or more solutions in the embodiments of the present application mentioned above have at least one of the following effects.

In the method for adjusting the frequency of the compressor according to the embodiment of the present application, in accordance with a determination that the exhaust temperature of the compressor is equal to or greater than the first preset temperature, the frequency reduction processing is performed on the compressor to reduce the exhaust temperature of the compressor to be less than the first preset temperature. The exhaust temperature of the compressor is suppressed through a frequency conversion control mode to solve the problem of excessive exhaust temperature of the compressor, a fan used for cooling the compressor can be saved, components of the heat exchange system is reduced, the structure of the heat exchange system is simplified. In accordance with a determination that no fan is required to cool the compressor, the compressor can be wrapped to reduce noise effectively.

Additional aspects and advantages of the present application will be partially given in the following description, and some thereof will become obvious from the following description, or be understood through the practice of the present application.

BRIEF DESCRIPTION OF THE DRAWINGS

In order to more clearly illustrate the solutions according to the present application or the related art, the accompanying drawings used in the description of the embodiments of the present application or the related art will be briefly introduced below. It should be noted that the drawings in the following description are only part embodiments of the present application. For those of ordinary skill in the art, other drawings can also be obtained according to these drawings without creative efforts.

DETAILED DESCRIPTION

The specific embodiments of the present application are further described in detail below in conjunction with the drawings and embodiments. The following embodiments are intended to illustrate the present application, but are not intended to limit the scope of the present application.

In the description of the embodiments of the present application, it should be noted that the terms "first", "second", "third", and the like are used for descriptive purposes only and are not to be construed as indicating or implying relative importance.

In the description of this specification, descriptions with reference to the terms "one embodiment", "some embodiments", "examples", "specific examples", or "some examples" etc. mean that specific features, structure, materials or characteristics described in conjunction with the embodiment or example are included in at least one embodiment or example of the embodiments of the present application. In this specification, the schematic expressions of the above terms do not necessarily refer to the same embodiment or example. Also, the described specific features, structures, materials or characteristics can be combined in any one or more embodiments or examples in a suitable manner. In addition, those skilled in the art may integrate and combine the different embodiments or examples and the features of the different embodiments or examples described in this specification without contradicting each other.

Figure 1:
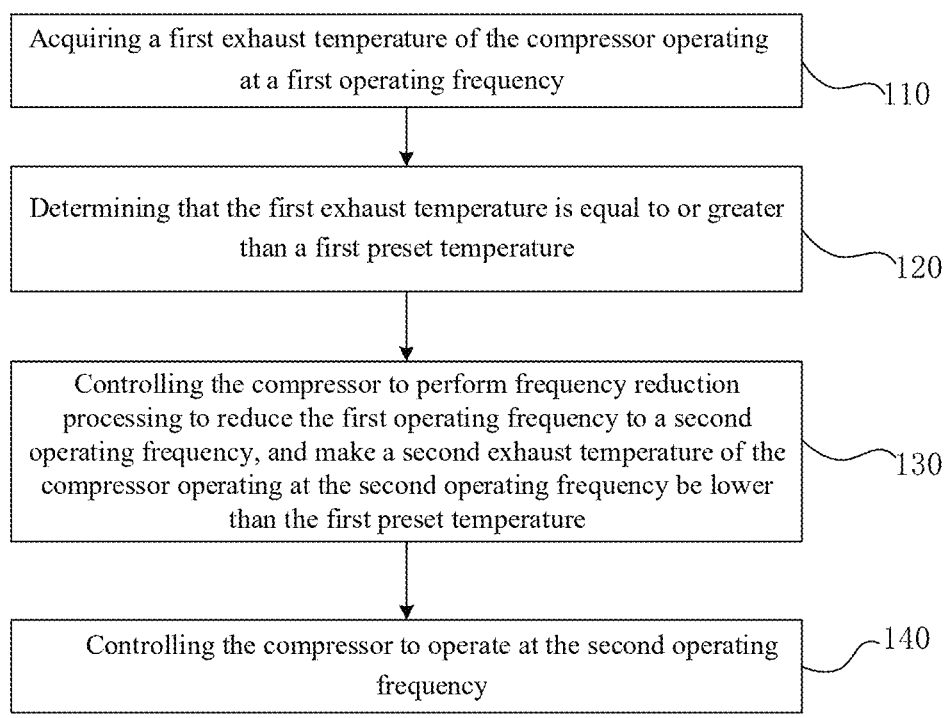
FIG. 1 is a schematic diagram of a method for adjusting a frequency of a compressor according to an embodiment of the present application.

An embodiment of the present application, as shown in FIG. 1, provides a method for adjusting a frequency of a compressor, which includes the following steps.

Step 110, acquiring a first exhaust temperature of the compressor operating at a first operating frequency.

For a variable frequency compressor, an operating frequency of the compressor would affect its exhaust temperature, and the exhaust temperature can be adjusted by adjusting the operating frequency of the compressor, and make the compressor operate stably while meeting the heat exchange requirements.

Step 120, determining that the first exhaust temperature is equal to or greater than a first preset temperature.

The first preset temperature can be regarded as a maximum exhaust temperature of the compressor or be slightly lower than the maximum exhaust temperature of the compressor. That is, in accordance with a determination that the exhaust temperature of the compressor reaches the maximum exhaust temperature, the compressor will shut down or give an alarm. In accordance with a determination that the first exhaust temperature of the compressor is equal to or greater than the first preset temperature, it can be understood that the compressor will shut down or is about to shut down.

Step 130, controlling the compressor to perform frequency reduction processing to reduce the first operating frequency to a second operating frequency, and make a second exhaust temperature of the compressor operating at the second operating frequency be lower than the first preset temperature.

The exhaust temperature of the compressor is adjusted by the frequency reduction processing, and the first operating frequency is dropped to the second operating frequency, and the exhaust temperature of the compressor is lowered to be less than the first preset temperature to avoid the compressor from shutting down or alarming, and ensuring the normal operating of the compressor. The exhaust temperature of the compressor can be measured by a temperature sensor arranged at the discharge port, and both the first exhaust temperature and the second exhaust temperature are exhaust temperatures measured by the temperature sensor at different operating frequencies.

The first exhaust temperature at the first operating frequency and the second exhaust temperature at the second operating frequency mentioned above can be real-time temperatures at the first operating frequency or the second operating frequency, or an average exhaust temperature within a preset period after the compressor operates at the first operating frequency or the second operating frequency for the preset period, or real-time temperatures after the preset period, which can be selected based on the actual operating scenes.

Step 140, controlling the compressor to operate at the second operating frequency.

The compressor operates at the second operating frequency, which can ensure the stable operation of the compressor to solve the problem that the compressor may shut down or give an alarm. The compressor operates at the second operating frequency until the heat exchange is completed, or performs frequency adjustment again after operating at the second operating frequency for a period of time, which can be specifically determined as needed.

In the method for adjusting the frequency of the compressor according to the embodiment of the present application, the exhaust temperature of the compressor is suppressed through a frequency conversion control method to solve the problem of excessive exhaust temperature of the compressor, a fan used for cooling the compressor can be saved, components of the heat exchange system is reduced, the structure of the heat exchange system is simplified. In the accordance with a determination that no fan is required to cool the compressor, the compressor can be wrapped to reduce noise effectively.

The method for adjusting a frequency of a compressor in the present embodiment is applicable to various heat exchange occasions, such as a clothes drying system, an air conditioning system, a water heater system, etc. The method has wide application range, is easy to operate and helpful to improve the operation stability of the system and solves problems that the service life and heat exchange efficiency are affected due to multiple starts and shutdowns of the compressor.

It can be understood that, in step 130, that is, in the controlling the compressor to perform frequency reduction processing, the first operating frequency is controlled to reduce to the second operating frequency by a first preset frequency difference in many times.

The present embodiment provides a specific frequency reduction processing method. In the process of dropping the first operating frequency to the second operating frequency, the first preset frequency difference is dropped each time until the exhaust temperature of the compressor at this operating frequency is lower than the first preset temperature, where the number of times of frequency reduction can be an integer equal to or greater than 2.

In accordance with a determination that the number of times of frequency reduction is as small as possible, in order to quickly reach the second operating frequency, the first preset frequency difference should be as large as possible to decrease the number of times of frequency reduction and make the operation process of the compressor more stable. In accordance with a determination that there is no limitation to the number of times of frequency reduction, the first preset frequency difference can be as small as possible, the second operating frequency is as close as possible to the first operating frequency, which ensures that the compressor operates at a higher operating frequency and ensure the operating efficiency of the compressor.

Before the frequency reduction processing, the first operating frequency can be regarded as the current operating frequency of the compressor. In accordance with a determination that the frequency reduction processing is performed for the first time, the first operating frequency is dropped by the first preset frequency difference to the current operating frequency, and the current exhaust temperature at the current operating frequency is measured. If the current exhaust temperature is less than the first preset temperature, the current operating frequency is the second operating frequency; if the first operating frequency is reduced by the first preset frequency difference to the current operating frequency and the measured current exhaust temperature is still greater than the first preset temperature, the current operating frequency will continue to be dropped by the first preset frequency difference to the new current operating frequency and a new current exhaust temperature at the new current operating frequency is measured and whether the new current exhaust temperature is greater than the first preset temperature is determined. Before the new current exhaust temperature is dropped below the first preset temperature, the frequency reduction processing is performed in many times until the latest current exhaust temperature is dropped below the first preset temperature and the latest current operating frequency is the second operating frequency.

It should be noted that the first preset frequency difference is not limited to a fixed value, but may be gradually changing values. For example, as the number of times of frequency reduction increases, the first preset frequency difference increases accordingly. Alternatively, as the number of times of frequency reduction increases, the first preset frequency difference decreases accordingly, which can be selected as needed. The value of the first preset frequency difference can be set as needed, such as 0.5 Hz, 1 Hz, 2 Hz, etc., but not limited to the above-mentioned values, and can also be other values.

It can be understood that, in step 130, that is, in the controlling the compressor to perform frequency reduction processing, the first operating frequency is controlled to reduce to the second operating frequency by a first preset frequency difference in many times and the first preset frequency difference increases as the number of times of frequency reduction increases.

That is to say, the first preset frequency difference changes from small to large and the first preset frequency difference in the first frequency reduction processing is the smallest. If the operating frequency can be dropped to the second operating frequency through the first frequency reduction processing, the second operating frequency can be as close as possible to the first operating frequency to ensure the heat exchange efficiency of the compressor. If the operating frequency is not dropped to the second operating frequency through the first frequency reduction processing, the first preset frequency difference will increase at this time, the first operating frequency can be quickly dropped to the second operating frequency by the number of times of frequency reduction processing as little as possible, and the number of times of frequency adjustment of the compressor can be reduced as much as possible, and the compressor has better operation stability.

For example, for the first frequency reduction processing, the first preset frequency difference is 1 Hz; for the second frequency reduction processing, the first preset frequency difference is 2 Hz; for the third frequency reduction processing, the first preset frequency difference is 3 Hz. Similarly, the first preset frequency difference gradually increases during the frequency reduction processing.

Figure 2:
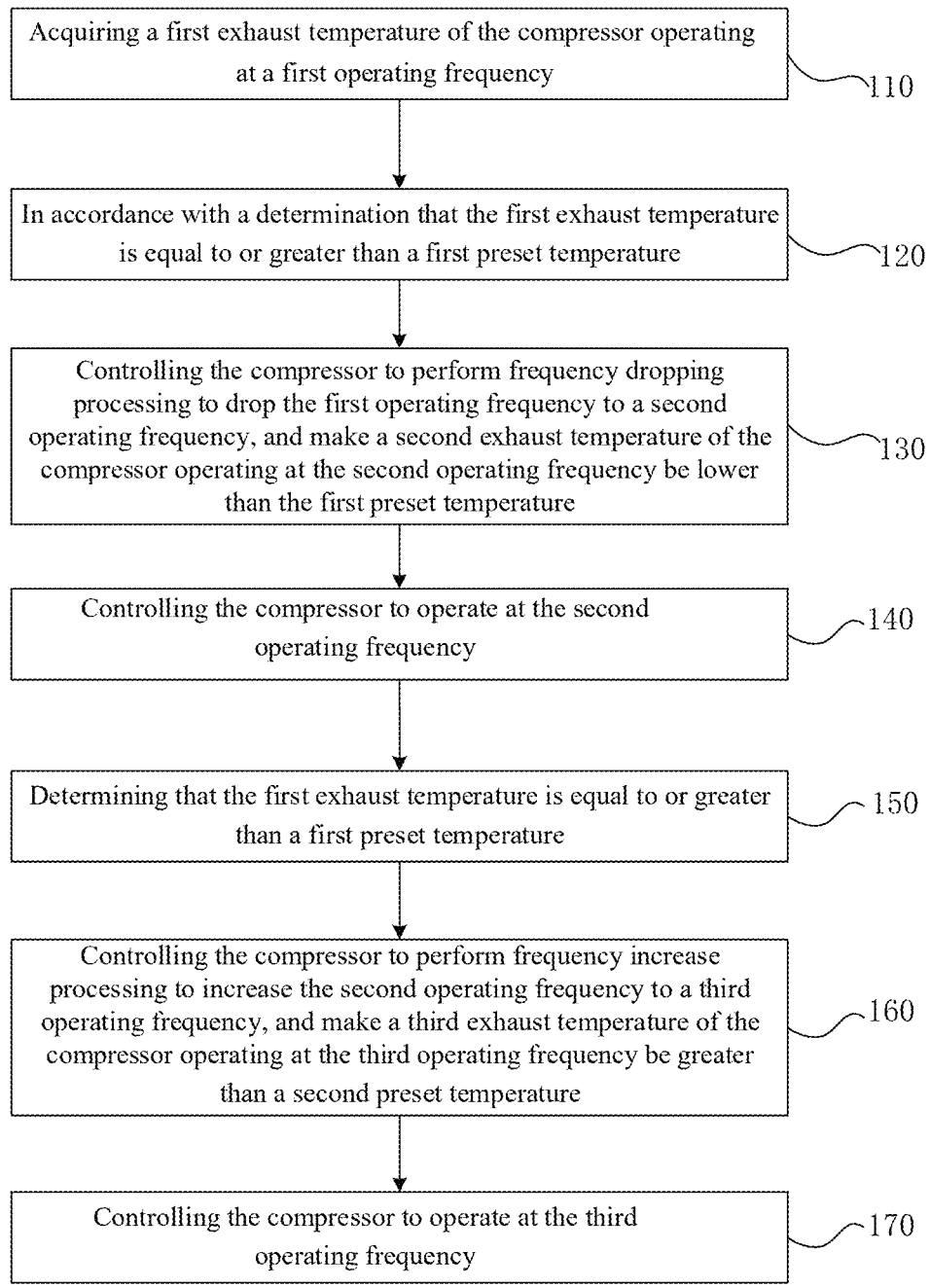
FIG. 2 is a schematic diagram of a method for adjusting a frequency of a compressor according to another embodiment of the present application.

It can be understood that, referring to FIG. 2, after step 140, that is, after the controlling the compressor to operate at the second operating frequency, Step 150, determining that the second exhaust temperature is less than the second preset temperature.

The exhaust temperature of the compressor operating at the second operating frequency is the second exhaust temperature. In order to ensure the heat exchange efficiency of the heat exchange system, the exhaust temperature of the compressor should be as high as possible, that is, the second exhaust temperature should be as close as possible to the first preset temperature. Therefore, a lower limit temperature for the second exhaust temperature is the second preset temperature to ensure heat exchange efficiency.

Step 160, controlling the compressor to perform frequency increase processing to increase the second operating frequency to a third operating frequency, and make a third exhaust temperature of the compressor operating at the third operating frequency be greater than a second preset temperature and less than the first preset temperature; in accordance with a determination that the second exhaust temperature is less than the second preset temperature, the exhaust temperature of the compressor is increased through frequency increase processing, that is, the operating frequency of the compressor is increased to the third operating frequency to ensure that the third exhaust temperature of the compressor operating at the third operating frequency is greater than a second preset temperature and less than the first preset temperature and thus the exhaust temperature of the compressor will not be too low, which ensures the heat exchange efficiency of the heat exchange system.

Step 170, controlling the compressor to operate at the third operating frequency.

The compressor operates at the second operating frequency, which can ensure the exhaust temperature of the compressor and ensure the heat exchange efficiency of the heat exchange system.

In the method for adjusting the frequency of the compressor according to the embodiment of the present application, the frequency adjustment method of the compressor in the present embodiment can not only solve the problem that the service life and heat exchange efficiency are affected due to multiple starts and shutdowns of the compressor, but also ensure that the exhaust temperature of the compressor is as close as possible to the first preset temperature, that is, ensure the heat exchange efficiency of the heat exchange system using the method for adjusting the frequency of the compressor, shorten a heat exchange time and improve the user experience.

It can be understood that in accordance with a determination that the third exhaust temperature of the compressor operating at the third operating frequency is equal to or greater than the first preset temperature; the compressor is controlled again to perform frequency adjusting processing, and the steps following the frequency reduction processing are sequentially performed.

That is, the frequency reduction processing and frequency increase processing can be performed in an alternate cycle, and the frequency of the compressor can be adjusted at any time during the operation of the compressor, and make the operating frequency of the compressor meet the dual requirements of continuous stable operation and heat exchange efficiency.

The first operating frequency, the second operating frequency and the third operating frequency can all be regarded as the current operating frequency, and the specific numerical values are not limited.

It can be understood that, based on step 130, that is, based on the controlling the compressor to perform frequency reduction processing, the first operating frequency is dropped to the second operating frequency by the first preset frequency difference in many times.

In step 150, that is, before determining that the second exhaust temperature is less than the second preset temperature, the second preset temperature is determined, and the second preset temperature is determined based on the number of times of frequency reduction being less than a first preset value.

The first preset frequency difference is a preset value, and the number of times of frequency reduction can be a preset value, such as once, 2 times, 3 times, 5 times, etc., the method for determining the second preset temperature, in combination with the first preset frequency difference and the number of times of frequency reduction, is simple, and it can ensure that the number of times of frequency reduction is within a set range, and the number of frequency adjusting of the compressor can be decreased as possible.

In the present embodiment, the second preset temperature can be adjusted as needed, and the method for adjusting the frequency of the compressor has a wider application range.

It should be noted that, the second preset temperature may also be a preset temperature, which is a preset value acquired from a test in advance before the device leaves the factory.

It can be understood that, in step 150, the first preset value is an integer less than or equal to 3. That is, the first preset value is 1, 2 or 3, and the smaller the first preset value, the smaller the number of times of frequency reduction, and the compressor operates at a stable frequency.

It can be understood that, in step 150, that is, before determining that the second exhaust temperature is less than the second preset temperature, the second preset temperature is determined, and a temperature difference between the second preset temperature and the first preset temperature is less than or equal to a preset temperature difference.

For a compressor, a maximum exhaust temperature of the compressor is a fixed value, that is, the first preset temperature is a fixed value, and the smaller the preset temperature difference, that is, the second preset temperature is closer to the first preset temperature, the higher the exhaust temperature of the compressor, the heat exchange efficiency of the heat exchange system can be ensured. Generally, the value of the preset temperature difference can be selected as needed, and the preset temperature difference can be selected as 2° C., 3° C. or 5° C.

It can be understood that, in step 160, that is, the controlling the compressor to perform frequency increase processing includes that: the second operating frequency is increased by a second preset frequency difference to the third operating frequency in many times.

The present embodiment provides a specific frequency increase processing mode. In the process of increasing the second operating frequency to the third operating frequency, the second preset frequency difference is increased each time until the exhaust temperature of the compressor at this operating frequency is higher than the second preset temperature, where the number of times of frequency reduction can be an integer equal to or greater than 1.

In accordance with a determination that the number of times of frequency increase is as small as possible, in order to quickly reach the third operating frequency, the second preset frequency difference should be as large as possible to decrease the number of times of frequency increase of the compressor and make the operation process of the compressor more stable. In accordance with a determination that there is no limitation to the number of times of frequency increase, the second preset frequency difference can be as small as possible, the second operating frequency is as close as possible to the first operating frequency to adjust the operating frequency stably and avoid the third operating frequency from exceeding the first operating frequency, which ensures that the compressor operates at a higher operating frequency and ensure the operating efficiency of the compressor.

It should be noted that the second preset frequency difference is not limited to a fixed value, but may be a gradually changing value. For example, as the number of times of frequency increase increases, the second preset frequency difference increases accordingly. Alternatively, as the number of times of frequency increase increases, the second preset frequency difference decreases accordingly, which can be selected as needed. The value of the second preset frequency difference can be set as needed, such as 0.5 Hz, 1 Hz, 2 Hz, etc., but not limited to the above-mentioned values, and can also be other values.

It can be understood that in step 160, in the second operating frequency is increased to a third operating frequency by a second preset frequency difference in many times; the second preset frequency difference and the number of times of frequency increase are determined based on a temperature difference between the second preset temperature and the first preset temperature.

After the second preset temperature is determined based on the method in the above-mentioned embodiment, the second preset temperature is a determined temperature value, and a temperature difference between the second preset temperature and the first preset temperature is a constant value. The second preset frequency difference and the number of times of frequency increase are determined based on the temperature difference and they can be reasonably determined.

The number of times of frequency increase should be as little as possible to reduce the number of times for which the compressor performs frequency adjusting and improve the operation stability of the compressor.

The relationship between the second preset frequency difference and the number of times of frequency increase can be obtained through fitting calculation or experiment.

It can also be understood that the difference from the above-mentioned embodiment is that in step 160, the second preset frequency difference increases as the number of times of frequency increase increases, and the second preset frequency difference changes from small to large and the second preset frequency difference in the first frequency increase processing is the smallest. If the operating frequency can be increased to the third operating frequency through the first frequency lifting processing, the third operating frequency can be as close as possible to the second operating frequency, and the third operating frequency can be avoided from exceeding the first operating frequency. If the operating frequency cannot be increased to the third operating frequency through the first frequency increase processing, the second preset frequency difference increases at this time, the second operating frequency can be quickly increased to the third operating frequency by the number of times of frequency reduction processing as little as possible, and the number of times of frequency adjustment of the compressor can be reduced as much as possible, and the compressor has better operation stability.

Generally, it is necessary to ensure that the third operating frequency is less than the first operating frequency to prevent the third exhaust temperature from exceeding the first preset temperature.

It can be understood that before step 110, before the acquiring a first exhaust temperature of the compressor operating at a first operating frequency; the method includes: determining the first operating frequency of the compressor based on an ambient temperature.

The first operating frequency can be regarded as the starting frequency of the compressor. The starting frequency of the compressor is determined based on ambient temperature. The ambient temperature is the temperature of ambient air where the heat exchange system running the method for adjusting the frequency of the compressor is located.

Different ambient temperatures will affect various parameters such as the heat dissipation efficiency of the compressor and the heat exchange efficiency of the heat exchange system. The first operating frequency is determined based on the ambient temperature and thus the compressor has higher operating efficiency.

The ambient temperature can be measured by an ambient temperature sensor, and the measurement method is simple. Alternatively, the ambient temperature is a temperature before the operation of the compressor measured by the temperature sensor on the compressor, which simplifies the structure.

It can be understood that the determining the first operating frequency of the compressor based on the ambient temperature includes: determining a first frequency as the first operating frequency in accordance with a determination that the ambient temperature is less than or equal to a first temperature or determining a second frequency as the first operating frequency in accordance with a determination that the ambient temperature is greater than the first temperature, where the second frequency is less than the first frequency.

The first temperature can be regarded as a high-temperature, and the first temperature can be 35° C., 40° C., etc., and the specific temperature value of the first temperature can be set as needed. In accordance with a determination that the ambient temperature is less than or equal to the first temperature, it can be understood that the compressor is operating within the normal ambient temperature range. In accordance with a determination that the ambient temperature is greater than the first temperature, it can be understood that the compressor is operating at a high ambient temperature. If the ambient temperature is a high temperature, the operating frequency of the compressor is then dropped from the first frequency to the second frequency, to decrease the exhaust temperature of the compressor, and avoid the shutdown of the compressor due to the high exhaust temperature.

Figure 3:
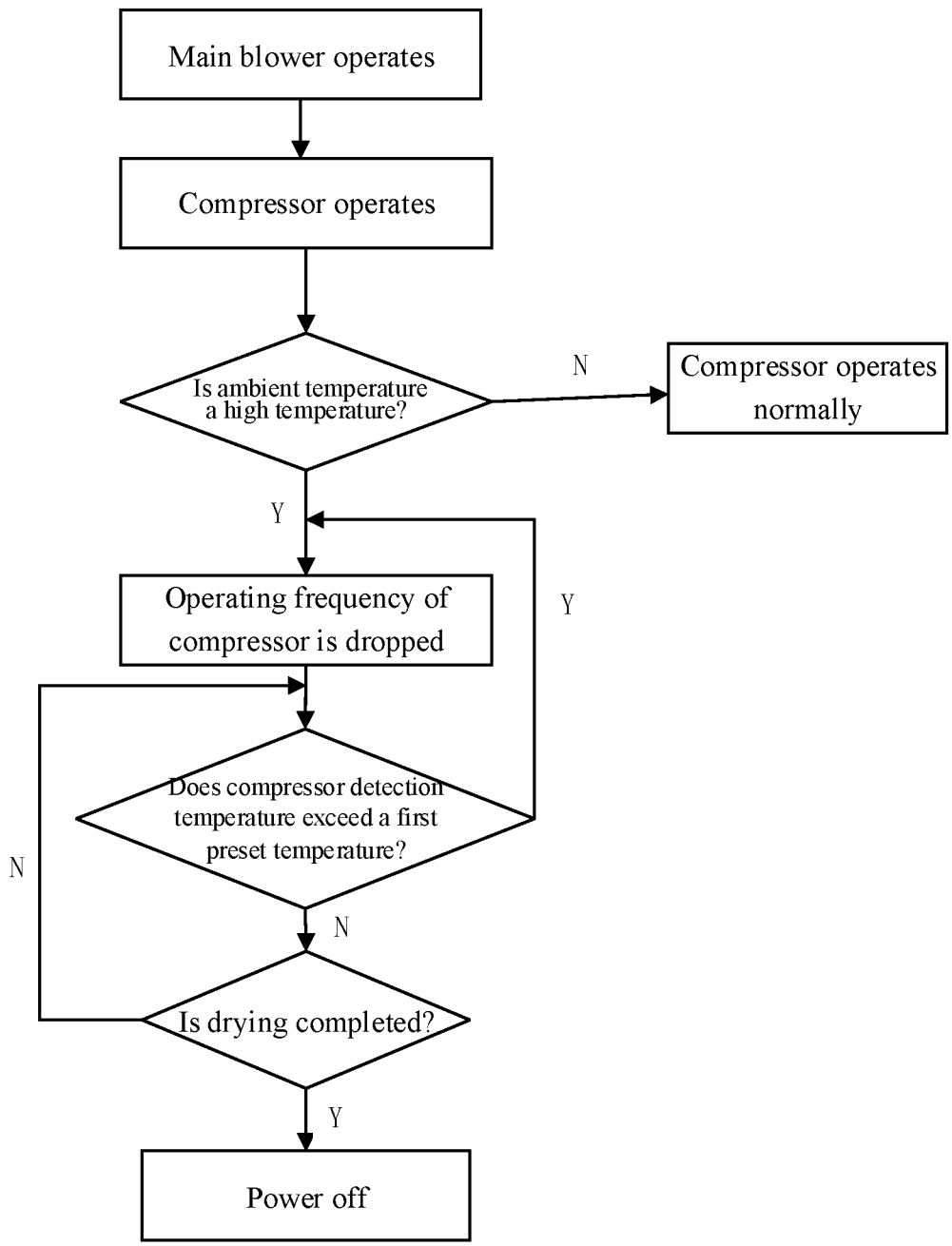
FIG. 3 is a schematic diagram of a method for adjusting a frequency of a compressor applied to a clothes drying system according to an embodiment of the present application.

In an application example, referring to FIG. 3, the method for adjusting the frequency of the compressor is applied to a clothes drying system, and the specific adjustment process is as follows.

First, it is monitored whether the ambient temperature is greater than the first temperature, that is, whether ambient temperature is a high-temperature. If it is not a high-temperature environment (the ambient temperature is less than or equal to the first temperature), the compressor operates at the normal first frequency; if it is a high-temperature environment (the ambient temperature is greater than first temperature), the compressor operates at the second frequency, and the second frequency is less than the first frequency.

Secondly, the exhaust temperature of the compressor is monitored. If the exhaust temperature of the compressor operating at the first operating frequency is equal to or greater than the first preset temperature, the compressor will perform frequency reduction processing based on the first preset frequency difference, and the frequency is adjusted repeatedly until the exhaust temperature of the compressor is below the first preset temperature, the compressor operates at the second operating frequency until the drying of clothes is completed.

Figure 4:
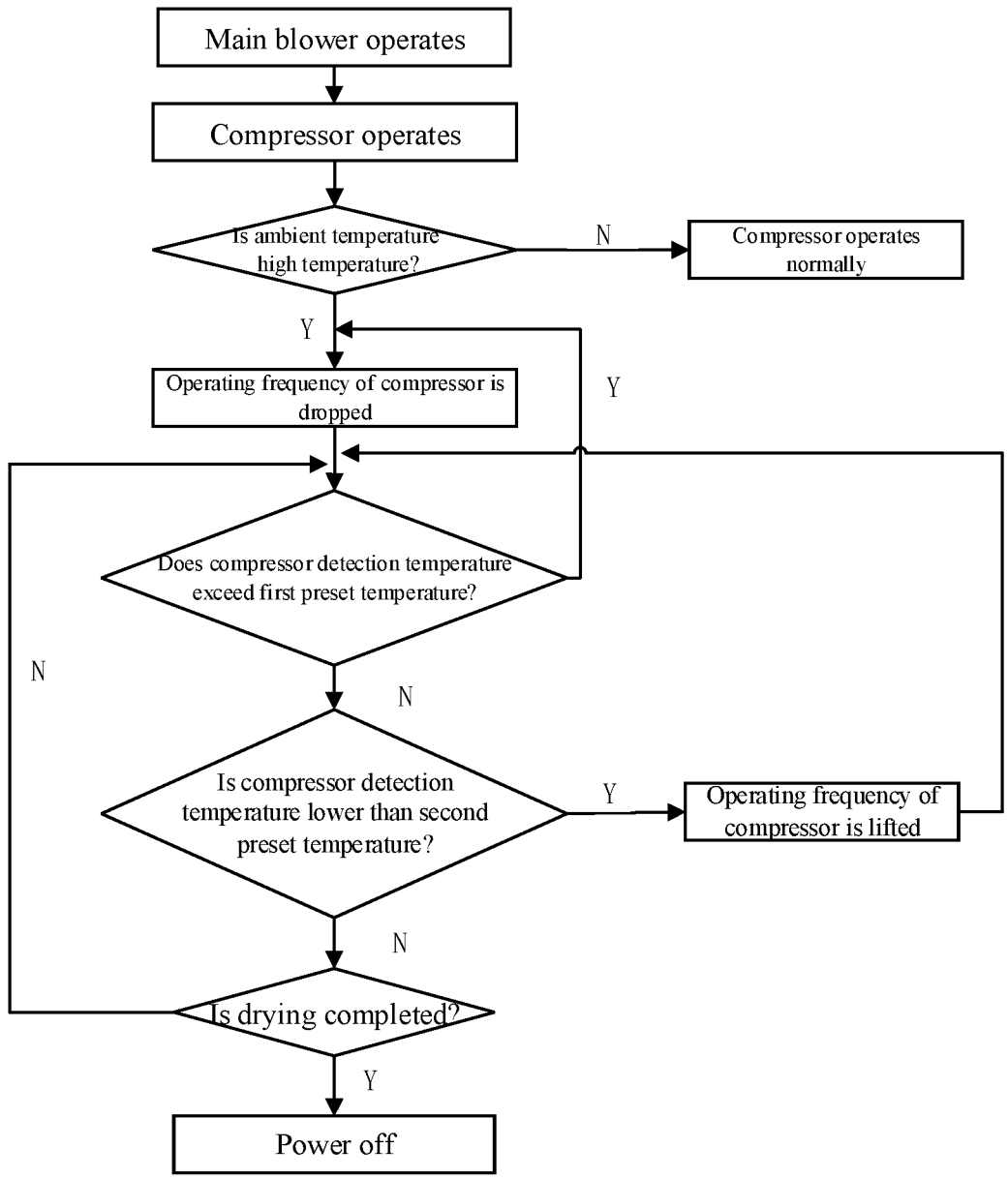
FIG. 4 is a schematic diagram of a method for adjusting a frequency of a compressor applied to a clothes drying system according to another embodiment of the present application.

In another embodiment, as shown in FIG. 4, it is on the basis of the above adjusting process.

Before the completion of drying clothes, in accordance with a determination that the second exhaust temperature of the compressor is less than or equal to the second preset temperature during the compressor operates at the second operating frequency, the compressor will perform frequency increase processing, and adjust the frequency repeatedly until the exhaust temperature of the compressor is above the second preset temperature, the operating frequency of the compressor is the third operating frequency at this time, and the compressor operates until the completion of drying clothes.

It should be noted that before the completion of drying clothes, in accordance with a determination that the third exhaust temperature is equal to or greater than the first preset temperature during the compressor operates at the third operating frequency, the compressor will perform frequency reduction processing based on the first preset frequency difference, and adjust the frequency repeatedly until the exhaust temperature of the compressor is below the first preset temperature. It can be understood that the compressor performs frequency reduction processing and frequency increase processing repeatedly and thus the exhaust temperature of the compressor is between the first preset temperature and the second preset temperature.

A fan used to dissipate heat from the compressor in a clothes drying system can be removed from the clothes drying system in the above embodiments, which reduces the complexity of the system, and also provides the possibility of reducing noise by wrapping the compressor. The main blower shown in FIG. 3 and FIG. 4 is a blower used in the clothes dryer system to promote the flow of air between a clothes drying cylinder and the heat exchange assembly.

A control apparatus for adjusting a frequency of a compressor according to the embodiment of present application includes: a first acquiring module, used to acquire a first exhaust temperature of the compressor operating at a first operating frequency; a first determining module, used to determine that the first exhaust temperature is equal to or greater than a first preset temperature; a first frequency adjusting module, used to control the compressor to perform frequency reduction processing to reduce the first operating frequency to a second operating frequency, and make a second exhaust temperature of the compressor operating at the second operating frequency be lower than the first preset temperature; and a first operating nodule, used to control the compressor to operate at the second operating frequency.

It can be understood that the first determining module is used to reduce the first operating frequency to the second operating frequency by a first preset frequency difference in many times.

The first preset frequency difference increases as the number of times of frequency reduction increases.

It can be understood that the control apparatus for adjusting the frequency of the compressor further includes: a second determining module, used to determine that that the second exhaust temperature is less than a second preset temperature; a second frequency adjusting module, used to control the compressor to perform frequency increase processing to lift the second operating frequency to a third operating frequency, and make a third exhaust temperature of the compressor operating at the third operating frequency be greater than a second preset temperature; and a second operating nodule, used to control the compressor to operate at the third operating frequency.

It can be understood that the second determining module is used to determine the second preset temperature based on the number of times of frequency reduction being less than a first preset value.

The first preset value is an integer less than or equal to 3.

It can be understood that the third determining module determines the second preset temperature, and a temperature difference between the second preset temperature and the first preset temperature is less than or equal to a preset temperature difference.

It can be understood that the second frequency adjusting module is used to lift the second operating frequency by a second preset frequency difference to the third operating frequency in many times.

The second frequency adjusting module is used to determine the second preset frequency difference and the number of times of frequency increase based on a temperature difference between the second preset temperature and the first preset temperature.

It can be understood that the fourth determining module is used to determine the first operating frequency of the compressor based on the ambient temperature.

A first frequency is determined as the first operating frequency in accordance with a determination that the ambient temperature is less than or equal to a first temperature or a second frequency is determined as the first operating frequency in accordance with a determination that the ambient temperature is greater than the first temperature, where the second frequency is less than the first frequency.

An embodiment of the present application provides a heat exchange device, including: a heat exchange assembly 604 and a controller 616, where the heat exchange assembly 604 includes a compressor 606, a condenser 608, a throttling device 610 and an evaporator 612 connected to form a heat exchange cycle. The controller 616 is used to control the compressor to perform the method for adjusting the frequency of the compressor 606 in one or more of the above embodiments, the heat exchange device has all the above beneficial effects, which will not be repeated here.

The compressor 606 is wrapped with a noise reduction layer 614 and the noise reduction layer 614 wraps the outer wall of the compressor 606 to play roles of sound insulation and noise reduction, and the noise of the compressor 606 is effectively suppressed under relatively high load.

The noise reduction layer 614 is made of materials such as sound-absorbing cotton, a sound insulation felt, and a sound insulation coating, which can be selected as actually needed. For example, the noise reduction layer 614 can be a felt wrapped on the surface of the compressor.

It can be understood that the heat exchanging device includes a housing, the heat exchange assembly 604 is arranged inside the housing 602, and no fan for cooling the compressor 606 is arranged inside the housing 602. In accordance with a determination that there is no fan for cooling the compressor 606 inside the housing, it is helpful to not only simplify the internal structure of the housing 602, and but also reduce the volume of the housing 602, and is beneficial to provide the miniaturization design of the heat exchange device.

Compared with the situation where a fan is used to cool down the compressor to solve the problem of excessively high exhaust temperature of the compressor, the method for adjusting the frequency of the compressor in one or more of the above embodiments is used to adjust the exhaust temperature of the compressor, the fan for cool the compressor may not be provided in the housing, and thus the internal structure of the heat exchange device is simpler, the parts of the heat exchange device are reduced, and the production cost and the user's power consumption cost are also decreased to a certain extent. In accordance with a determination that the heat exchange device according to an embodiment of the present application is a clothes dryer or an washer dryer. The internal structure of the clothes dryer or an washer dryer is simplified, the overall volume of the clothes dryer or an washer dryer is decreased, the volume of the drying cylinder is increased under the condition that the external dimensions remain unchanged, the drying capacity is expanded and the user experience is improved.

It can be understood that the heat exchanging device is a clothes dryer 600, a washer dryer 600 or an integrated washer dryer 600. The compressor 606 in the clothes dryer or the washer dryer operates with the aforementioned solution, which makes the dry cleaning more efficient and the compressor more stable, which helps to improve user experience.

Figure 5:
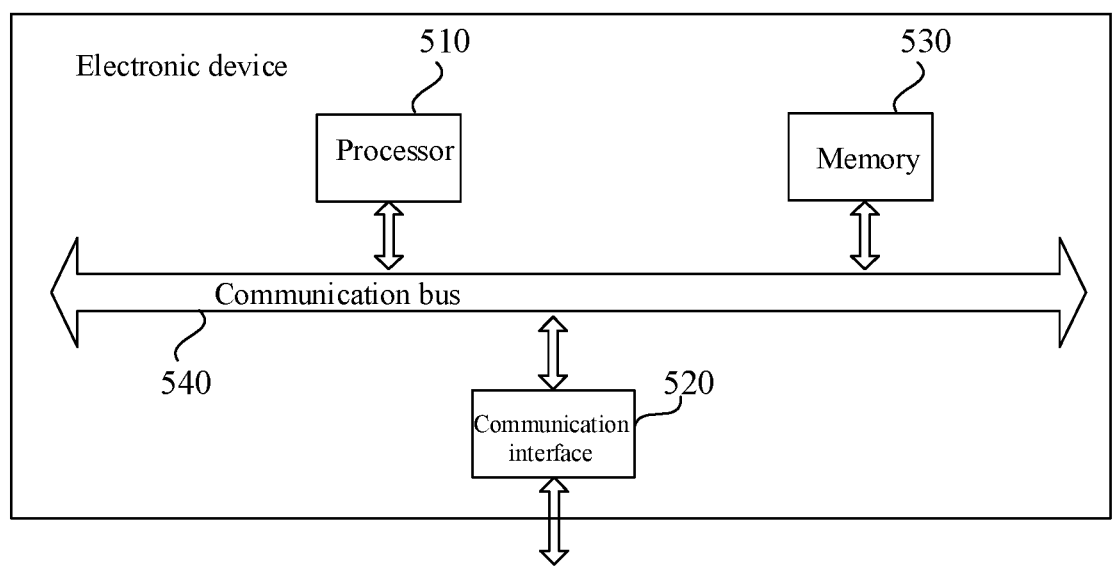
FIG. 5 is a schematic structural diagram of an electronic device according to an embodiment of the present application.
Figure 6:
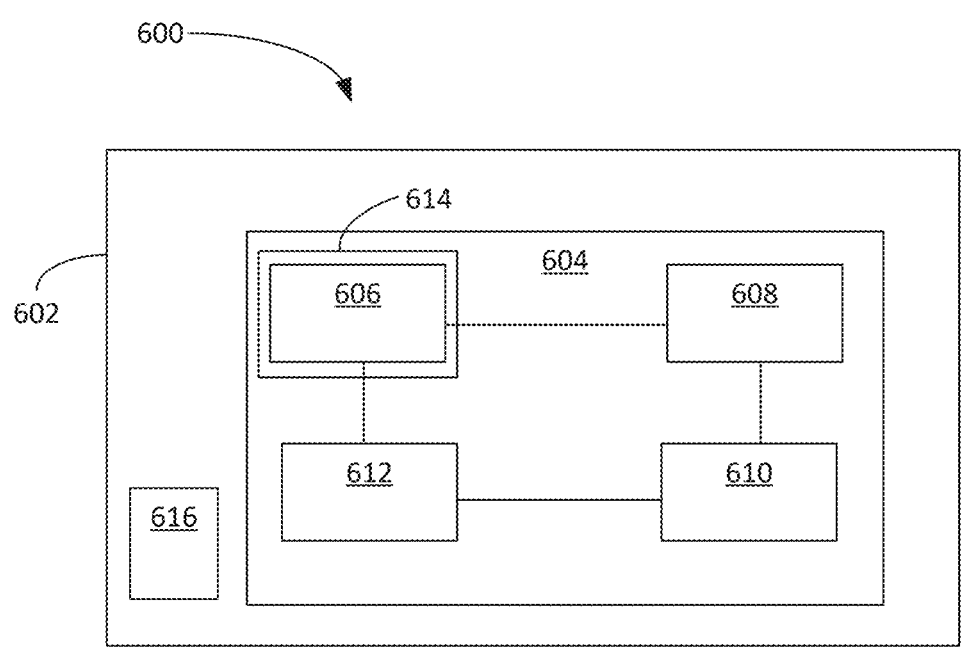
FIG. 6 is a schematic diagram of a heat exchanging device according to some embodiments of the present application.

An embodiment of the present application provides an electronic device. FIG. 5 is a schematic diagram of the physical structure of an electronic device. As shown in FIG. 5, the electronic device may include a processor 510, a communication interface 520, a memory 530, and a communication bus 540. The processor 510, the communication interface 520, and the memory 530 communicate with each other through the communication bus 540. The processor 510 may invoke the logic instructions in the memory 530 to perform the method for adjusting the frequency of the compressor in one or more embodiments above.

In addition, the logic instructions in the memory 530 described above may be implemented in the form of a software functional unit and may be stored in a computer readable storage medium while being sold or used as a separate product. Based on such understanding, the technical solution of the present application or a part of the technical solution, which is essential or contributes to the prior art, may be embodied in the form of a software product, which is stored in a storage medium, including several instructions to cause a computer device (which may be a personal computer, server, or network device, etc.) to perform all or part of the steps of the methods described in various embodiments of the present application. The storage medium described above includes various media that can store program codes such as U disk, mobile hard disk, read-only memory (ROM), random access memory (RAM), magnetic disk, or optical disk.

An embodiment of the present application discloses a computer program product, including: a computer program stored on a non-transitory computer readable storage medium, the computer program comprises program instructions, when executed by a computer, causing the computer to perform the method for adjusting the frequency of the compressor in one or more embodiments.

The present application provides a non-transitory computer-readable storage medium having stored thereon computer programs, the computer programs, when executed by a processor, causes the processor to perform the method for adjusting the frequency of the compressor in one or more embodiments.

The device embodiments described above are merely illustrative, wherein the units described as separate components may or may not be physically separate, and the components displayed as units may or may not be physical units, that is, may be located at the same place or be distributed to multiple network units. Some or all of the modules may be selected according to actual needs to achieve the purpose of the solution of the present embodiment. Those of ordinary skill in the art can understand and implement the embodiments described above without paying creative labors.

Through the description of the embodiments above, those skilled in the art can clearly understand that the various embodiments can be implemented by means of software and a necessary general hardware platform, and of course, by hardware. Based on such understanding, the solutions of the present application in essence or a part of the solutions that contributes to the prior art, or a part of the solutions, may be embodied in the form of a software product, which may be stored in a storage medium such as ROM/RAM, magnetic discs, optical discs, etc., and includes several instructions to cause a computer device (which may be a personal computer, server, or network device, etc.) to perform the methods described in various embodiments or a part thereof.

Finally, it should be noted that the above embodiments are only used to explain the solutions of the present application, and are not limited thereto; although the present application is described in detail with reference to the foregoing embodiments, it should be understood by those skilled in the art that they can still modify the solutions described in the foregoing embodiments and make equivalent replacements to a part of the technical features and these modifications and substitutions do not depart from the spirit and scope of the solutions of the embodiments of the present application.

The implementations above are only used to illustrate the present application, but not to limit the present application. Although the present application has been described in detail with reference to the embodiments, those skilled in the art should understand that various combinations, modifications, or equivalent substitutions of the solutions of the present application do not depart from the scope of the solutions of the present application, and should be covered by the scope of the claims of the present application.

What is claimed is:

1. A method for adjusting a frequency of a compressor, comprising:
   determining a first operating frequency based on an ambient temperature;
   operating the compressor at the first operating frequency;
   acquiring a first exhaust temperature of the compressor operating at the first operating frequency; and
   in accordance with a determination that the first exhaust temperature is equal to or greater than a first preset temperature:
      controlling the compressor to perform frequency reduction processing to reduce the first operating frequency to a second operating frequency, and making a second exhaust temperature of the compressor operating at the second operating frequency be lower than the first preset temperature, wherein controlling the compressor to perform frequency reduction processing to reduce the first operating frequency to a second operating frequency comprises controlling the compressor to operate at the second operating frequency, and wherein the first preset temperature is associated with a maximum exhaust temperature of the compressor, the compressor is a compressor of a heat exchange assembly of a heat exchange device, wherein the heat exchange assembly further comprises an evaporator and a condenser, the heat exchange assembly is arranged inside a housing of the heat exchange device, and the method includes:
   in accordance with a determination that the first exhaust temperature of the compressor reaches the maximum exhaust temperature of the compressor, sounding an alarm or shutting down the compressor.

2. The method of claim 1, wherein
   the first operating frequency is controlled to reduce to the second operating frequency by a first preset frequency difference over one or more times of frequency reduction.

3. The method of claim 2, wherein the first preset frequency difference increases as a number of times of frequency reduction increases.

4. The method of claim 1, further comprising:
   in accordance with a determination that the second exhaust temperature of the compressor operating at the second operating frequency is less than a second preset temperature:
      controlling the compressor to perform frequency increase processing to increase the second operating frequency to a third operating frequency, and making a third exhaust temperature of the compressor operating at the third operating frequency be greater than a second preset temperature; and
      controlling the compressor to operate at the third operating frequency.

5. The method of claim 4, wherein in the controlling the compressor to perform frequency reduction processing, the first operating frequency is controlled to reduce to the second operating frequency by a first preset frequency difference over one or more times of frequency reduction; and
   before determining that the second exhaust temperature is less than the second preset temperature,
   determining the second preset temperature, wherein the second preset temperature is determined based on a number of times of frequency reduction being less than a first preset value, or based on a temperature difference between the second preset temperature and the first preset temperature being less than or equal to a preset temperature difference.

6. The method of claim 5, wherein the first preset value is an integer less than or equal to 3.

7. The method of claim 4, wherein
   the second operating frequency is increased to a third operating frequency by a second preset frequency difference over one or more times of frequency increase.

8. The method of claim 7, wherein
   the second operating frequency is increased to the third operating frequency by the second preset frequency difference over one or more times of frequency increase, and
   the second preset frequency difference and a number of times of frequency increase are determined based on a temperature difference between the second preset temperature and the first preset temperature.

9. The method of claim 1, further comprising:
   before acquiring a first exhaust temperature of the compressor operating at a first operating frequency,
   determining the first operating frequency of the compressor based on an ambient temperature.

10. The method of claim 9, wherein determining the first operating frequency of the compressor based on an ambient temperature comprises:
    in accordance with a determination that the ambient temperature is less than or equal to a first temperature, determining a first frequency as the first operating frequency; and in accordance with a determination that the ambient temperature is greater than the first temperature, determining a second frequency as the first operating frequency, wherein the second frequency is lower than the first frequency.

11. A heat exchange device, comprising:

a heat exchange assembly, including a compressor, a condenser and an evaporator connected to form a heat exchange cycle; and a controller, used to control the compressor to perform a method for adjusting a frequency of the compressor, including:

determining a first operating frequency based on an ambient temperature;

operating the compressor at the first operating frequency;

acquiring a first exhaust temperature of the compressor operating at the first operating frequency; and in accordance with a determination that the first exhaust temperature is equal to or greater than a first preset temperature:

controlling the compressor to perform frequency reduction processing to reduce the first operating frequency to a second operating frequency, and making a second exhaust temperature of the compressor operating at the second operating frequency be lower than the first preset temperature, wherein controlling the compressor to perform frequency reduction processing to reduce the first operating frequency to a second operating frequency comprises controlling the compressor to operate at the second operating frequency, and wherein the first preset temperature is associated with a maximum exhaust temperature of the compressor, the heat exchange assembly is arranged inside a housing of a heat exchange device, and the method includes:

in accordance with a determination that the first exhaust temperature of the compressor reaches the maximum exhaust temperature of the compressor, sounding an alarm or shutting down the compressor.

12. The heat exchange device of claim 11, wherein the compressor is wrapped with a noise reduction layer.

13. The heat exchange device of claim 11, further comprising a housing, wherein the heat exchange assembly is arranged inside the housing, and no fan for cooling the compressor is arranged inside the housing.

14. The heat exchange device of claim 11, wherein the heat exchange device is a clothes dryer or an integrated washer dryer.

* * * * *